(12) United States Patent
Glocki et al.

(10) Patent No.: US 11,240,105 B2
(45) Date of Patent: Feb. 1, 2022

(54) CONTROL OF SCANNING SHARED RESOURCES BY DEVICES FOR SOFTWARE DISCOVERY

(71) Applicant: International Business Machines Corporation, Armonk, NY (US)

(72) Inventors: Dariusz P. Glocki, Cracow (PL); Artur Obrzut, Cracow (PL); Piotr P. Godowski, Cracow (PL); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/364,472

(22) Filed: Mar. 26, 2019

(65) Prior Publication Data

US 2020/0313967 A1    Oct. 1, 2020

(51) Int. Cl.
| | | |
|---|---|---|
| *H04L 12/24* | (2006.01) | |
| *H04L 29/08* | (2006.01) | |
| *G06F 15/16* | (2006.01) | |
| *G06F 15/173* | (2006.01) | |
| *H04H 60/09* | (2008.01) | |

(52) U.S. Cl.
CPC .......... *H04L 41/0853* (2013.01); *H04L 67/10* (2013.01)

(58) Field of Classification Search
CPC ... H04L 41/0853; H04L 67/10; G06F 16/152; G06F 16/11; G06F 2009/45579; G06F 8/70; G06F 9/4411; G06F 16/901; G06F 16/90335; G06F 16/908; G06F 16/93; G06F 2201/865; G06F 9/44505; G06F 8/60; G06F 8/61; G06Q 10/101; G06Q 10/103; G06Q 10/1095
See application file for complete search history.

(56) References Cited

U.S. PATENT DOCUMENTS

| | | | | |
|---|---|---|---|---|
| 7,469,274 | B1 * | 12/2008 | Ryu | G06F 21/78 |
| | | | | 709/214 |
| 8,010,947 | B2 * | 8/2011 | Carbone | G06F 8/60 |
| | | | | 717/121 |
| 9,172,623 | B1 * | 10/2015 | Micali | H04L 43/08 |
| 9,891,907 | B2 * | 2/2018 | Searle | H04L 63/10 |
| 10,621,204 | B2 * | 4/2020 | Mital | G06Q 10/06 |
| 2006/0039335 | A1 * | 2/2006 | Ono | H04W 92/02 |
| | | | | 370/338 |

(Continued)

*Primary Examiner* — David R Lazaro
*Assistant Examiner* — Berhanu Shitayewoldetadik
(74) *Attorney, Agent, or Firm* — Steven Bouknight; Edell, Shapiro & Finnan, LLC

(57) ABSTRACT

A computer system performs software discovery on a shared resource in a network. A logical group is generated for the shared resource, wherein the logical group includes a plurality of devices accessing the shared resource. A designated device is selected from the plurality of devices for performing a software discovery operation on the shared resource, wherein the selection is based on one or more performance factors. Results of the software discovery operation on the shared resource are received from the designated device. The results of the software discovery operation are distributed by the designated device to the plurality of devices. Embodiments of the present invention further include a method and program product for performing software discovery on a shared resource in a network in substantially the same manner described above.

9 Claims, 5 Drawing Sheets

(56) References Cited

U.S. PATENT DOCUMENTS

| | | | | |
|---|---|---|---|---|
| 2006/0142005 | A1* | 6/2006 | Takaluoma | G06F 9/548 455/435.1 |
| 2008/0115139 | A1* | 5/2008 | Inglett | G06F 9/522 718/102 |
| 2008/0172583 | A1* | 7/2008 | Mahajan | G06F 11/3672 714/57 |
| 2008/0235664 | A1* | 9/2008 | Carbone | G06F 8/60 717/120 |
| 2009/0031286 | A1* | 1/2009 | Yee | G06Q 10/06 717/120 |
| 2010/0174763 | A1* | 7/2010 | Pastorelli | G06F 11/3006 707/822 |
| 2012/0158732 | A1* | 6/2012 | Mital | G06Q 10/06 707/741 |
| 2012/0258700 | A1* | 10/2012 | Chang | H04W 12/08 455/418 |
| 2013/0223280 | A1* | 8/2013 | Choi | H04L 67/104 370/254 |
| 2013/0223341 | A1* | 8/2013 | Kim | H04W 76/14 370/328 |
| 2013/0275697 | A1* | 10/2013 | Van Kempen | H04L 67/1097 711/162 |
| 2014/0006588 | A1* | 1/2014 | Wouhaybi | H04L 67/1097 709/224 |
| 2015/0039875 | A1* | 2/2015 | Di Cocco | G06F 8/63 713/2 |
| 2015/0082382 | A1* | 3/2015 | Maguire | H04L 69/18 726/3 |
| 2015/0085702 | A1* | 3/2015 | Al Agha | H04L 45/122 370/254 |
| 2015/0237128 | A1* | 8/2015 | Castro | H04L 67/025 709/203 |
| 2015/0256391 | A1* | 9/2015 | Hardy | H04L 67/10 709/222 |
| 2015/0256401 | A1* | 9/2015 | Zinger | H04L 41/14 370/401 |
| 2015/0302074 | A1* | 10/2015 | Mital | G06F 16/951 707/603 |
| 2016/0004848 | A1* | 1/2016 | Gocek | H04L 41/0286 726/26 |
| 2016/0026449 | A1 | 1/2016 | Gierlak et al. | |
| 2016/0072913 | A1* | 3/2016 | Baldwin | H04L 67/16 709/201 |
| 2017/0116040 | A1* | 4/2017 | Cropper | G06F 9/45558 |
| 2017/0126550 | A1* | 5/2017 | Taylor | H04L 43/024 |
| 2017/0141991 | A1 | 5/2017 | Godowski et al. | |
| 2017/0150374 | A1* | 5/2017 | Abadi | H04W 24/02 |
| 2017/0192853 | A1* | 7/2017 | Alberti | G06F 11/3466 |
| 2017/0255483 | A1 | 9/2017 | Hanusiak et al. | |
| 2018/0091516 | A1* | 3/2018 | Nixon | H04L 63/20 |
| 2018/0123940 | A1* | 5/2018 | Rimar | H04L 45/02 |
| 2018/0288144 | A1* | 10/2018 | Tondepu | H04L 29/06823 |
| 2018/0321927 | A1* | 11/2018 | Borthakur | G06F 8/62 |
| 2018/0352544 | A1* | 12/2018 | Wang | H04W 72/048 |
| 2019/0182839 | A1* | 6/2019 | Wells | H04W 72/1252 |
| 2019/0268236 | A1* | 8/2019 | Makovsky | H04L 67/30 |
| 2020/0025629 | A1* | 1/2020 | Zinger | G01K 1/02 |
| 2020/0313967 | A1* | 10/2020 | Glocki | H04L 67/10 |
| 2020/0366576 | A1* | 11/2020 | Leboyer | H04L 41/5038 |

\* cited by examiner

CONTROL OF SCANNING SHARED RESOURCES BY DEVICES FOR SOFTWARE DISCOVERY

BACKGROUND

1. Technical Field

Present invention embodiments relate to software discovery, and more specifically, to controlling the scanning of shared resources by devices for the purpose of software discovery.

2. Discussion of the Related Art

Software discovery refers to the detection of software that is installed on a computing system. Software discovery may be performed for a variety of purposes, including the tracking and management of software licenses. When performing software discovery, it may be necessary to detect not only the software that is installed on a local computing system, but also any software that is installed on a remote resource that is shared with the system. For example, if a device has both local storage and a mounted network resource, then software discovery may be performed on both the local storage and the network resource. One difficult aspect of performing software discovery on shared network resources is that multiple devices may simultaneously perform scans on the same shared resource, thereby negatively impacting the resource's performance.

SUMMARY

According to one embodiment of the present invention, a computer system performs software discovery on a shared resource in a network. A logical group is generated for the shared resource, wherein the logical group includes a plurality of devices accessing the shared resource. A designated device is selected from the plurality of devices for performing a software discovery operation on the shared resource, wherein the selection is based on one or more performance factors. Results of the software discovery operation on the shared resource are received from the designated device. The results of the software discovery operation are distributed by the designated device to the plurality of devices. Embodiments of the present invention further include a method and program product for performing software discovery on a shared resource in a network in substantially the same manner described above.

BRIEF DESCRIPTION OF THE DRAWINGS

Generally, like reference numerals in the various figures are utilized to designate like components.

DETAILED DESCRIPTION

Figure 1:
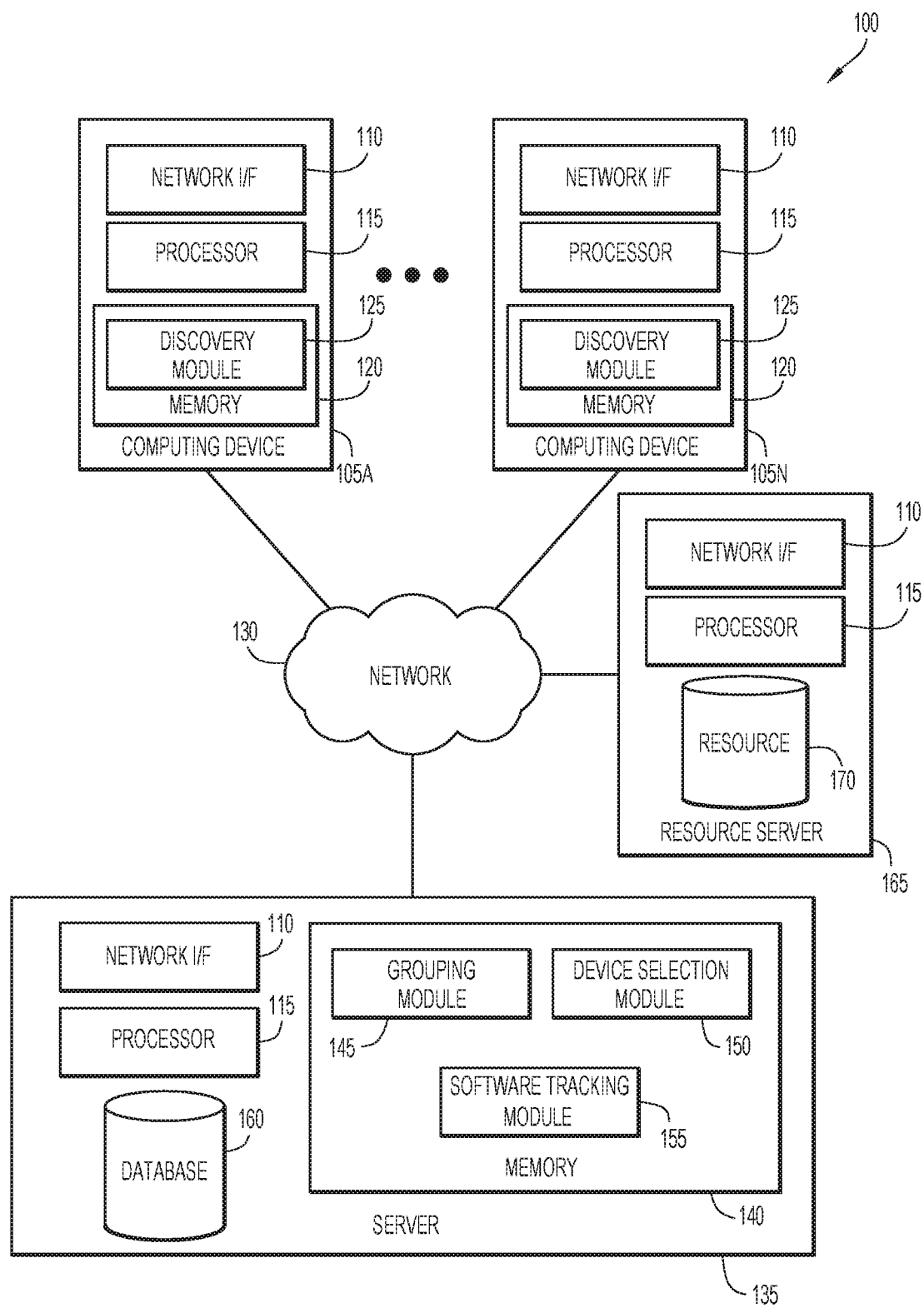
FIG. 1 is a block diagram depicting a computing environment for performing software discovery on a shared resource in a network in accordance with an embodiment of the present invention.

Present invention embodiments relate to software discovery, and more specifically, to controlling the scanning of shared resources by devices for the purpose of software discovery. In a computing environment in which multiple devices access remote resources over a network, it may be difficult to efficiently detect software on the remote resources. In particular, if remote resources are shared among multiple devices, and the devices are tasked with software discovery, multiple devices may perform software discovery scans on the same shared resource. However, multiple simultaneous scans may negatively impact a shared resource due to the number of the read operations performed by each scan.

Present invention embodiments improve software discovery on shared resources by designating a single device to perform software discovery operation on behalf of a group of devices. A group of devices that all access a shared resource are analyzed to select a designated device based on performance factors of the device, and the designated device shares the results of software discovery scans with the other devices in the group. By performing software discovery with only one device, software discovery may be performed more efficiently. Present invention embodiments reduce the performance impact caused by software discovery scans being performed on a shared resource by eliminating the possibility of concurrent scans. Furthermore, present invention embodiments improve performance of a shared resource by avoiding the unnecessary performance of multiple asynchronous software discovery scans; since the results of a designated device's scan are shared with all members of a group of devices, it is unnecessary for the other devices to perform their own software discovery operations.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for performing software discovery on a shared resource in a network in accordance with an embodiment of the present invention. As depicted, computing environment 100 includes endpoint devices 105A-105N, a software discovery server 135, and a resource server 165. It is to be understood that the functional division among components of computing environment 100 have been chosen for purposes of explaining present invention embodiments and is not to be construed as a limiting example.

Each computing device 105A-105N includes a network interface 110, at least one processor 115, and memory 120 that includes discovery module 125. Each computing device 105A-105N may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 110 enables components of each computing device 105A-105N to send and receive data over a network, such as network 130. Each computing device 105A-105N may include internal and external hardware components, as depicted and described in further detail with respect to FIG. 5.

Discovery module 125 may include one or more modules or units to perform various functions of present invention embodiments described below. Discovery module 125 may be implemented by any combination of any quantity of software and/or hardware modules or units, and may reside within memory 120 of each computing device 105A-105N for execution by a processor, such as processor 115.

Discovery module 125 may perform software discovery operations on local or remote storage volumes of a computing device to identify installed software. Discovery module 125 may identify installed software by searching the contents of a local or remote storage medium. A local storage medium may include any storage volume corresponding to a storage medium that is local to a device, and a remote medium may include any storage medium that is physically located in another computing device, but is mounted to, or otherwise accessible by, the computing device. Thus, discovery module 125 of any computing device 105A-105N may perform software discovery on any network-accessible storage medium, such as resource 170 of resource server 165.

Discovery module 125 may apply any known or other software discovery techniques in order to identify installed software. Discovery module 125 may identify installed software by searching for the presence of executable files on a storage volume, by processing one or more inventory lists of installed software, such as lists that are managed by an operating system, and the like. Discovery module 125 may analyze metadata of an executable file to locate information pertaining to a name of the corresponding software. In some embodiments, discovery module 125 identifies software by querying a file name of an executable file against a database or index to determine a name of the installed software. The identity of an installed software package may include any identifier, including a trade name of the software or any other descriptor. In some embodiments, discovery module 125 performs software discovery operations according to a predetermined schedule. A computing device, such as computing device 105A, may not perform software discovery operations using discovery module 125 unless the computing device has been designated to perform software discovery for a logical group by discovery server 135 or its modules. Thus, a computing device may be prevented from performing software discovery operations when the computing device is not authorized to do so.

Network 130 may include a local area network (LAN), a wide area network (WAN) such as the Internet, or a combination of the two, and includes wired, wireless, or fiber optic connections. In general, network 130 can be any combination of connections and protocols known in the art that will support communications between computing devices 105A-105N, discovery server 135, and/or resource server 165 via their respective network interfaces 110 in accordance with embodiments of the present invention.

Discovery server 135 includes a network interface 110, at least one processor 115, memory 140, and a database 160. Memory 140 includes a grouping module 145, a device selection module 150, and a software tracking module 155. In various embodiments of the present invention, discovery server 135 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of discovery server 135 to send and receive data over a network, such as network 130. In general, discovery server 135 enables computing devices 105A-105N to perform software discovery in accordance with present invention embodiments. Discovery server 135 may include internal and external hardware components, as depicted and described in further detail with respect to FIG. 5.

Grouping module 145, device selection module 150, and software tracking module 155 may include one or more modules or units to perform various functions of present invention embodiments described below. Grouping module 145, device selection module 150, and software tracking module 155 may be implemented by any combination of any quantity of software and/or hardware modules or units, and may reside within memory 140 of discovery server 135 for execution by a processor, such as processor 115.

Grouping module 145 may identify logical groups of computing devices that access a shared resource. Grouping module 145 may receive information from each computing device 105A-105N regarding any network-accessible resources that each computing device has mounted. Alternatively or additionally, grouping module 145 may access a computing system associated with a shared resource, such as resource server 165, to determine which computing devices have accessed the shared resource. Grouping module 145 may define a logical group that includes any computing devices that have accessed a shared resource. In some embodiments, grouping module 145 periodically (e.g., daily) updates logical groups to ensure that computing devices that access a same shared resource are grouped together accordingly. Grouping module 145 may manage multiple logical groups, and each logical group may include members that are also members of one or more other logical groups. For example, if a particular computing device, such as computing device 105A has accessed three different shared resources, then grouping module 145 may assign computing device 105A to three logical groups, each group corresponding to one of the three shared resources.

Device selection module 150 may analyze the devices in a logical group in order to select a device as the designated software discovery device for the group. Device selection module 150 may receive information from each computing device 105A-105N that comprises a set of performance factors. One performance factor may include a device's computing resource utilization, including processor utilization, memory utilization, and the like. Another performance factor may include the network distance between a device and a shared resource. The network distance may be measured according to a number of hops between the device and the shared resource. In some embodiments, a computing device measures the network distance to a resource by executing a traceroute command to determine the number of hops and transit delays of packets between hops. Each computing device 105A-105N may generate and log performance factor information over time, and the performance factor information may be shared as instantaneous measurements and/or as averages over time.

Device selection module 150 may analyze the performance factors of a logical group of computing devices to select one device as a designated device for performing software discovery on behalf of the group. In general, device selection module 150 may select a device having a short network distance to a resource and/or a low utilization of a computing resource (e.g., processing resource, memory resource, etc.). A score may be calculated for each computing device based on one or more of the performance factors. In some embodiments, each performance factor is weighted according to a priority. In some embodiments, processor utilization of a computing device is weighted more heavily than network distance in order to favor selection of computing devices having lower processor utilization. For example, a computing device that has a shortest distance to a shared resource may not be selected as a designated software discovery device for a logical group if the computing device has a high amount of processor utilization. A computing device, such as computing device 105A, may only perform software discovery (using discovery module 125) if device selection module 150 has designated the computing device to perform software discovery.

In some embodiments, device selection module 150 monitors the status of a device that has been selected to perform software discovery to ensure that the device is functioning. Device selection module 150 may receive a heartbeat signal from the designated device and/or may periodically attempt to reach the designated device in order to confirm that the designated device is still network-accessible and performing software discovery operations. In the event that device selection module 150 detects that a designated device is no longer functioning properly, device selection module 150 may select another device in the logical group to perform software discovery operations.

Software tracking module 155 may receive information from a designated device relating to discovered software, track which software is installed, and share information relating to installed software with other computing devices, such as computing devices 105A-105N. A computing device that has been designated by device selection module 150 to perform software discovery for a logical group may transmit the results of software discovery operations to software tracking module 155. Software tracking module 155 may receive results from a designated computing device periodically (e.g., according to a predetermined schedule) or on an ad hoc basis when the designated computing device discovers an installed software package on a shared resource.

Software tracking module 155 may manage a software inventory list to track discovered software. In some embodiments, software tracking module 155 may manage a software inventory list in database 160 of discovery server 135. Software tracking module 155 may share discovered software with computing devices 105A-105N. In some embodiments, each computing device 105A-105N may access database 160 of discovery server 135 to obtain the results of software discovery operations. If a software discovery operation indicates that a particular software package is no longer installed on a resource, software tracking module 155 may remove the software from the software inventory list.

Database 160 may include any non-volatile storage media known in the art. For example, database 160 can be implemented with a tape library, optical library, one or more independent hard disk drives, or multiple hard disk drives in a redundant array of independent disks (RAID). Similarly, data on database 160 may conform to any suitable storage architecture known in the art, such as a file, a relational database, an object-oriented database, and/or one or more tables. Database 160 may store data relating to software discovery, including a software inventory list for one or more shared resources. Database 160 may also store information relating to logical group membership, such as the group membership status of each computing device 105A-105N.

Resource server 165 includes a network interface 110, at least one processor 115, memory 140, and a database 160. Memory 140 includes a grouping module 145, a device selection module 150, and a software tracking module 155. In various embodiments of the present invention, resource server 165 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of resource server 165 to send and receive data over a network, such as network 130. In general, resource server 165 hosts one or more shareable data storage media (such as resource 170) that may be accessed by a computing device over network 130. Resource server 165 may include internal and external hardware components, as depicted and described in further detail with respect to FIG. 5.

Resource 170 may include any non-volatile storage media known in the art. For example, resource 170 can be implemented with a tape library, optical library, one or more independent hard disk drives, or multiple hard disk drives in a redundant array of independent disks (RAID). Similarly, data on resource 170 may conform to any suitable storage architecture known in the art, such as a file, a relational database, an object-oriented database, and/or one or more tables. Resource 170 may be a storage medium that is remotely accessible by a computing device, such as any computing device 105A-105N. A computing device may mount or otherwise access data stored on resource 170 in order to execute software applications that may be installed to resource 170.

Figure 2:
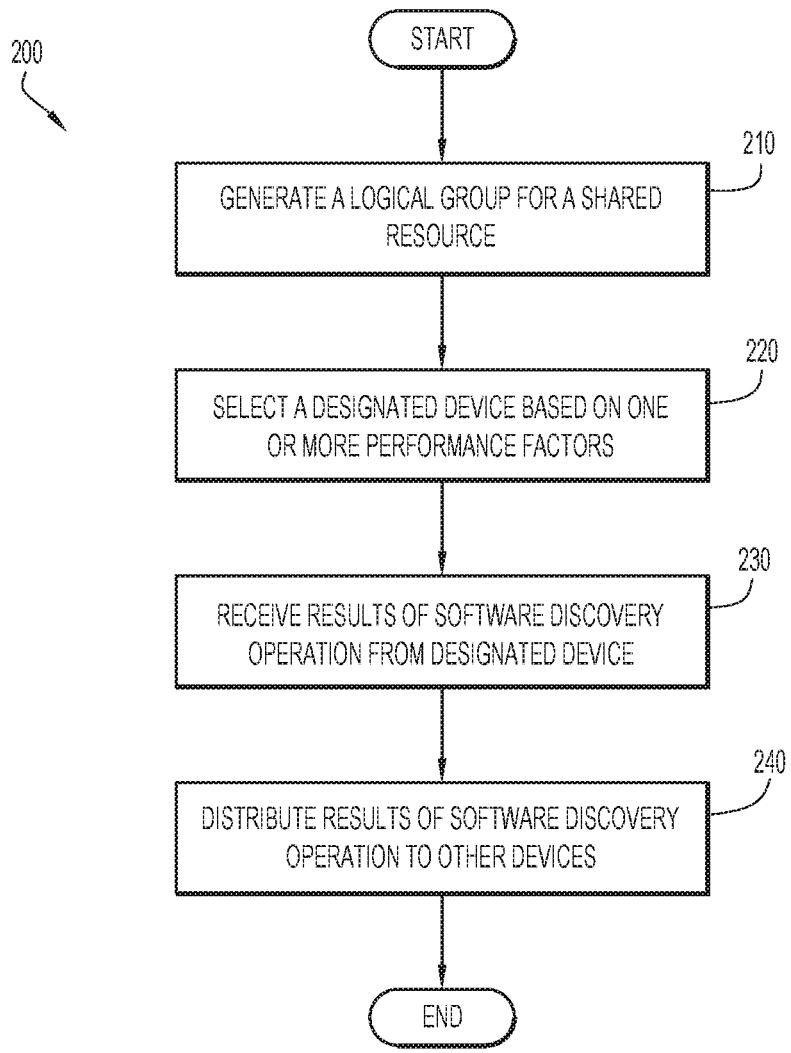
FIG. 2 is a flow chart depicting a method of performing software discovery on a shared resource in a network in accordance with an embodiment of the present invention.

FIG. 2 is a flow chart depicting a method 200 of performing software discovery on a shared resource in a network in accordance with an embodiment of the present invention.

A logical group for a shared resource is generated at operation 210. Grouping module 145 of discovery server 135 may generate logical groups by identifying computing devices that access a resource. For example, grouping module 145 may generate a logical group that includes one or more computing devices 105A-105N that access resource 170 of resource server 165. A computing device's membership in one logical group may not affect the device's eligibility for membership in other logical groups.

A designated device is selected based on one or more performance factors at operation 220. Performance factors that are considered may include the amount of computing resources (e.g., processing resources, memory resources, etc.) utilized by each computing device and the network distance of each computing device to resource 170. Device selection module 150 may calculate a score for each computing device of a logical group based on a device's performance factors. In some embodiments, performance factors are provided with weights. Device selection module 150 may utilize current or history measures of performance factors or time averages of performance factors. In some embodiments, one or more computing devices may be excluded from consideration based on an identity of the computing device; a computing device may be filtered from a candidate list of designated devices according to the device's network address, host name, or any other identifier associated with the computing device. A computing device may be excluded as a candidate for performing software discovery if the computing device has already been selected as a designated device for another logical group. In some embodiments, a computing device may be manually defined as a designated device for a logical group. When a computing device, such as computing device 105A, is selected as a designated device, then that computing device may perform software discovery operations on a shared resource, and other computing devices in the logical group may not perform software discovery operations.

The results of a software discovery operation are received at operation 230. Software tracking module 155 of discovery server 135 may receive the results of a software discovery operation from a computing device that was designated to perform software discovery operations at operation 220. Software tracking module 155 may receive information that identifies software packages installed to a shared resource, such as resource 170.

The results of a software discovery operation are distributed to other devices in the logical group at operation 240. Software tracking module 155 may transmit results of the software discovery operation to other devices in the logical group. Thus, each computing device that is a member of a logical group may benefit from the software discovery operations of a single computing device in a manner that reduces computing resource consumption and avoids redundancy.

Figure 3:
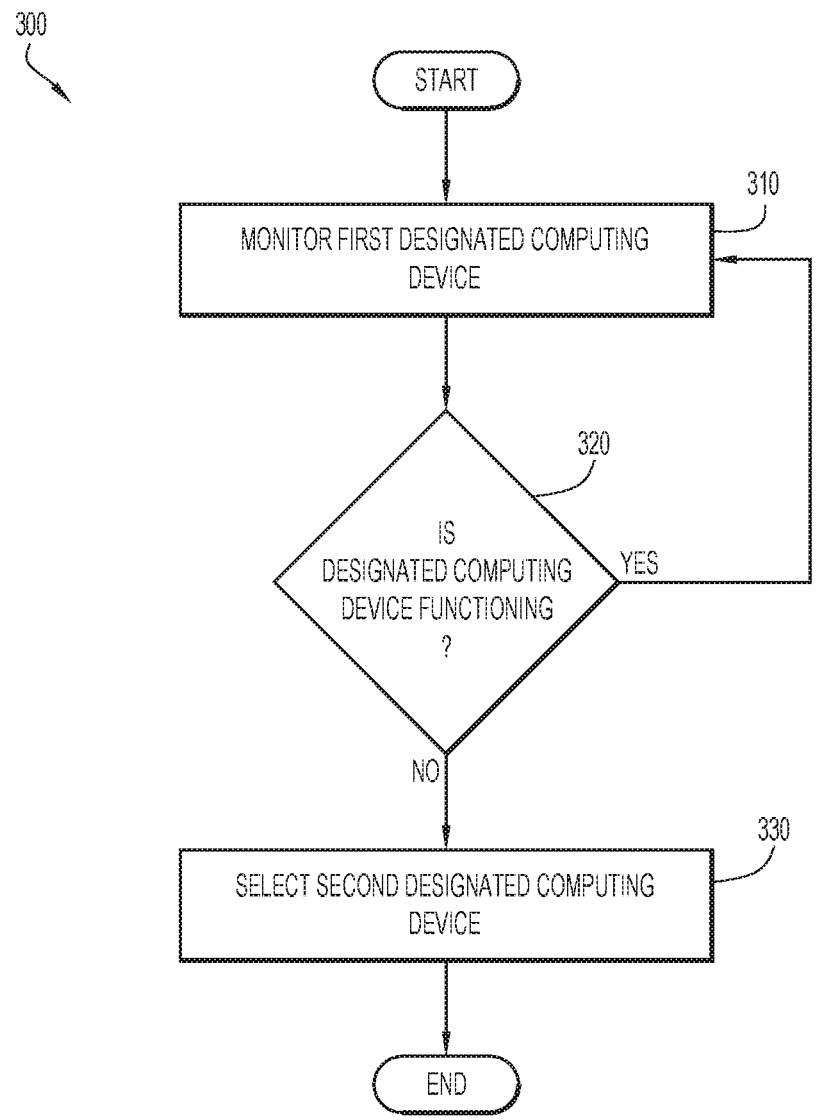
FIG. 3 is a flow chart depicting a method of maintaining software discovery continuity in accordance with an embodiment of the present invention.

FIG. 3 is a flow chart depicting a method 300 of maintaining software discovery continuity in accordance with an embodiment of the present invention.

A first designated computing device is monitored at operation 310. Device selection module 150 may monitor a first designated device as the device performs software discovery operations. The first designated device may transmit a heartbeat signal to discovery server 135 to indicate that the first designated device is functioning correctly. Additionally or alternatively, discovery server 135 may periodically ping or otherwise attempt to contact the designated computing device to identify the operational status of the device.

Operation 320 determines whether the designated computing device is functioning. If the designated computing device is functioning properly (e.g., performing software discovery operations), then method 300 may return to operation 310 and continue to monitor the device. However, if the designated computing device is no longer functioning, as indicated by a cessation of a heartbeat signal or other indication of a non-operational status, then method 300 proceeds to operation 330 to select a new designated device for the logical group.

A second computing device is selected as a designated device for the logical group at operation 330. Device selection module 150 may select a new computing device to perform software discovery operations for a logical group by analyzing the performance factors of each device. When a second computing device is selected, the second computing device may perform software discovery operations. In some embodiments, if the first computing device becomes operational again, device selection module 150 may reinstate the first computing device as the device that is designated to perform software discovery as long as the first computing device continues to outrank the second computing device in terms of performance factors.

Figure 4:
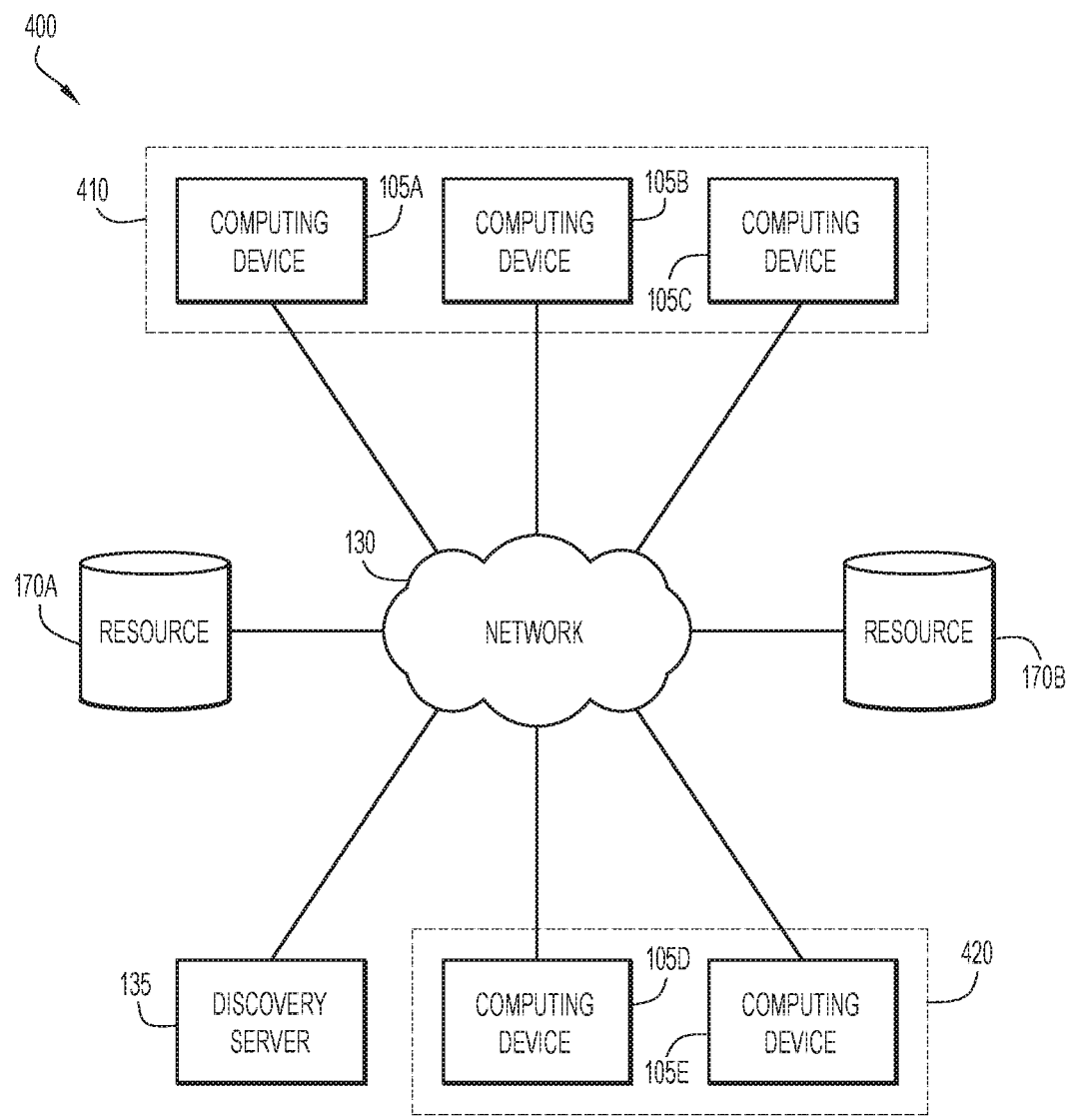
FIG. 4 is an example of a computing environment for performing software discovery in accordance with an embodiment of the present invention.

FIG. 4 is an example of a computing environment 400 for performing software discovery in accordance with an embodiment of the present invention. As depicted, computing environment 400 includes a first logical group 410 of computing devices 105A-105C, a second logical group 420 of computing devices 105D-105E, network 130, discovery server 135, and two shared resources 170A and 170B.

Discovery server 135 and its modules may analyze computing devices 105A-105E to identify logical groups 410 and 420. For example, logical computing devices 105A-105C may all access resource 170A, and may therefore be assigned to a same logical group 410. Similarly, computing devices 105D and 105E may access resource 170B and may be assigned to logical group 420. It should be appreciated that in various embodiments, computing devices may belong to one or more groups; for example, if computing device 105D accesses both resources 170A and 170B, then computing device 105D may be a member of both logical groups 410 and 420.

After assigning computing devices to logical groups, discovery server 135 and its modules may designate a computing device from each logical group to perform software discovery. For example, computing device 105B may be designated for logical group 410 based on the performance factors of computing devices 105A-105C. Similarly, computing device 105D may be designated for logical group 420. Thus, computing device 105B may perform software discovery on resource 170A and computing device 105D may perform software discovery on resource 170B; designated computing devices 105B and 105D may then share the results of their respective software discovery operations with the other members of logical groups 410 and 420, respectively. The results of software discovery operations may be shared with members of each logical group either directly or via discovery server 135.

Figure 5:
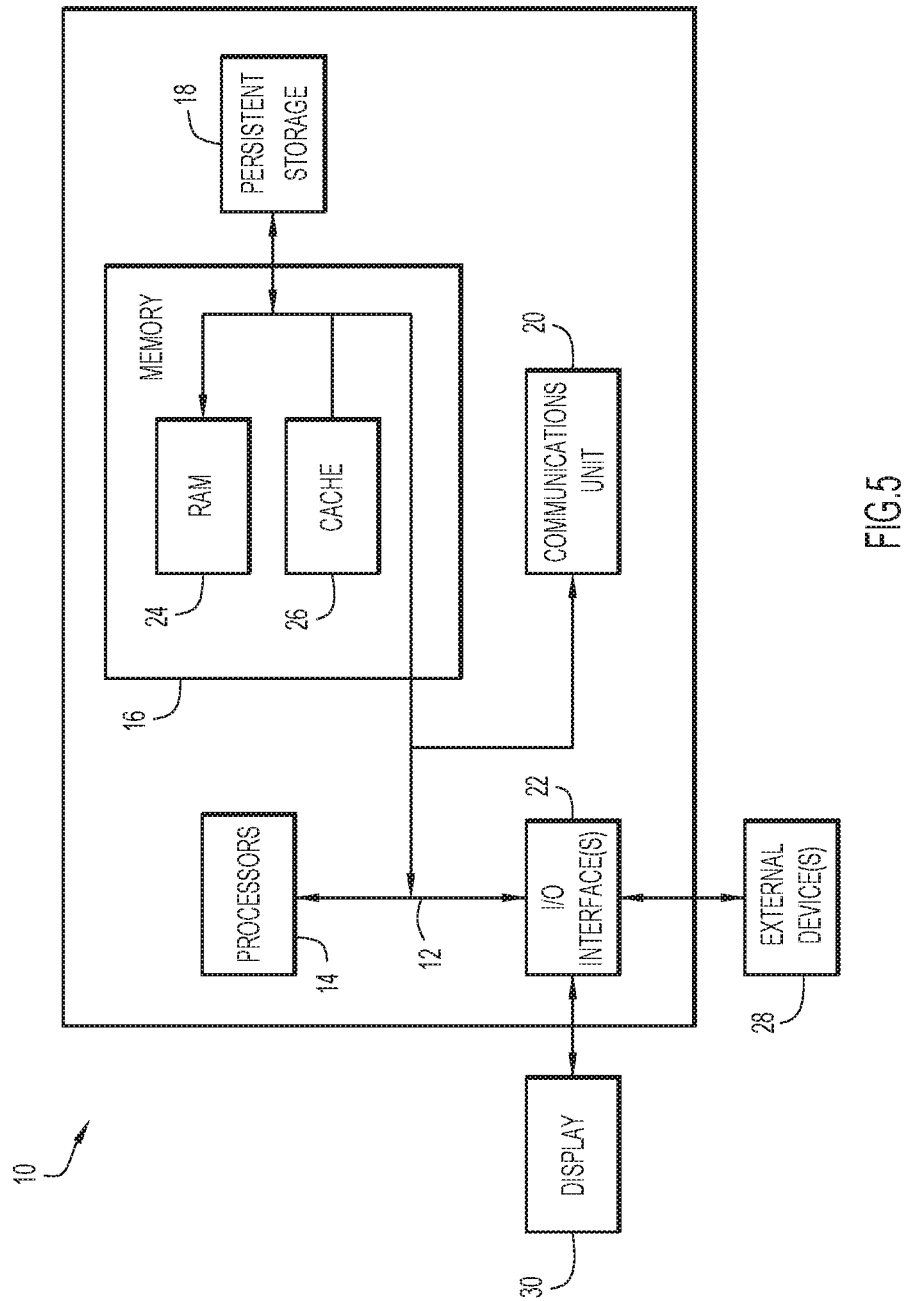
FIG. 5 is a block diagram depicting a computing device in accordance with an embodiment of the present invention.

FIG. 5 is a block diagram depicting components of a computer 10 suitable for executing the methods disclosed herein. Computer 10 may implement computing devices 105A-105N, discovery server 135, and/or resource server 165 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to performing software discovery on shared resources (e.g., logical group membership information, shared resource information, inventory lists of installed software, etc.) may be stored within any conventional or other data structures (e.g., files, arrays, lists, stacks, queues, records, etc.) and may be stored in any desired storage unit (e.g., database, data or other repositories, queue, etc.). The data transmitted between computing devices 105A-105N, discovery server 135, and/or resource server 165 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to performing software discovery on shared resources (e.g., logical group membership information, shared resource information, inventory lists of installed software, etc.) may include any information provided to, or generated by, computing devices 105A-105N, discovery server 135, and/or resource server 145. Data relating to performing software discovery may include any desired format and arrangement, and may include any quantity of any types of fields of any size to store any desired data. The data relating to performing software discovery may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to performing software discovery on shared resources), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of performing software discovery on shared resources.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, networking software, discovery module 125, grouping module 145, device selection module 150, software tracking module 155, etc.). These systems may include any types of monitors and input devices (e.g., keyboard, mouse, voice recognition, etc.) to enter and/or view information.

It is to be understood that the software (e.g., server software, networking software, discovery module 125, grouping module 145, device selection module 150, software tracking module 155, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, networking software, discovery module 125, grouping module 145, device selection module 150, software tracking module 155, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to performing software discovery). The database system may be implemented by any number of any conventional or other databases, data stores or storage structures (e.g., files, databases, data structures, data or other repositories, etc.) to store information (e.g., data relating to performing software discovery). The database system may be included within or coupled to the server and/or client systems. The database systems and/or storage structures may be remote from or local to the computer or other processing systems, and may store any desired data (e.g., data relating to performing software discovery).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for performing software discovery on a shared resource in a network, comprising:
   generating a logical group for the shared resource, wherein the logical group includes a plurality of devices accessing the shared resource;
   selecting, from the plurality of devices, a designated device for performing a software discovery operation, wherein the designated device is selected to perform the software discovery operation on the shared resource by searching the shared resource for executable files and querying a file name of each executable file against an index to determine an identity of each installed software item, wherein the selection is based on a plurality of performance factors, wherein the plurality of performance factors includes a processor utilization of each of the plurality of devices and a network distance between each of the plurality of devices and the shared resource, the network distance comprising a number of hops between each device and the shared resource, and transit delays of packets for each hop, and wherein each of the plurality of performance factors is weighted according to a priority, the priority selected from a group of: prioritizing the performance factor of the network distance over the performance factor of the processor utilization, and prioritizing the performance factor of the processor utilization over the performance factor of the network distance;
   receiving, from the designated device, results of the software discovery operation on the shared resource; and
   distributing, by the designated device, the results of the software discovery operation to the plurality of devices.

2. The computer-implemented method of claim 1, further comprising:
   determining that the designated device is no longer able to perform the software discovery operation;
   selecting a second designated device to replace the designated device, wherein the second designated device is selected based on the plurality of performance factors;
   receiving, from the second designated device, results of the software discovery operation on the shared resource; and
   distributing, by the second designated device, the results of the software discovery operation to the plurality of devices.

3. The computer-implemented method of claim 1, wherein selecting a designated device further comprises:

excluding one or more devices of the plurality of devices from selection by applying one of: network address filtration, and host name filtration.

4. A computer system for performing software discovery on a shared resource in a network, the computer system comprising:
one or more computer processors;
one or more computer readable storage media;
program instructions stored on the one or more computer readable storage media for execution by at least one of the one or more computer processors, the program instructions comprising instructions to:
generate a logical group for the shared resource, wherein the logical group includes a plurality of devices accessing the shared resource;
select, from the plurality of devices, a designated device for performing a software discovery operation, wherein the designated device is selected to perform the software discovery operation on the shared resource by searching the shared resource for executable files and querying a file name of each executable file against an index to determine an identity of each installed software item, wherein the selection is based on a plurality of performance factors, wherein the plurality of performance factors includes a processor utilization of each of the plurality of devices and a network distance between each of the plurality of devices and the shared resource, the network distance comprising a number of hops between each device and the shared resource, and transit delays of packets for each hop, and wherein each of the plurality of performance factors is weighted according to a priority, the priority selected from a group of: prioritizing the performance factor of the network distance over the performance factor of the processor utilization, and prioritizing the performance factor of the processor utilization over the performance factor of the network distance;
receive, from the designated device, results of the software discovery operation on the shared resource; and
distribute, by the designated device, the results of the software discovery operation to the plurality of devices.

5. The computer system of claim 4, wherein the program instructions further comprise instructions to:
determine that the designated device is no longer able to perform the software discovery operation;
select a second designated device to replace the designated device, wherein the second designated device is selected based on the plurality of performance factors;
receive, from the second designated device, results of the software discovery operation on the shared resource; and
distribute, by the second designated device, the results of the software discovery operation to the plurality of devices.

6. The computer system of claim 4, wherein the program instructions to select a designated device further comprise instructions to:
exclude one or more devices of the plurality of devices from selection by applying one of: network address filtration, and host name filtration.

7. A computer program product for performing software discovery on a shared resource, the computer program product comprising one or more computer readable storage media collectively having program instructions embodied therewith, the program instructions executable by a computer to cause the computer to:
generate a logical group for the shared resource, wherein the logical group includes a plurality of devices accessing the shared resource;
select, from the plurality of devices, a designated device for performing a software discovery operation, wherein the designated device is selected to perform the software discovery operation on the shared resource by searching the shared resource for executable files and querying a file name of each executable file against an index to determine an identity of each installed software item, wherein the selection is based on a plurality of performance factors, wherein the plurality of performance factors includes a processor utilization of each of the plurality of devices and a network distance between each of the plurality of devices and the shared resource, the network distance comprising a number of hops between each device and the shared resource, and transit delays of packets for each hop, and wherein each of the plurality of performance factors is weighted according to a priority, the priority selected from a group of: prioritizing the performance factor of the network distance over the performance factor of the processor utilization, and prioritizing the performance factor of the processor utilization over the performance factor of the network distance;
receive, from the designated device, results of the software discovery operation on the shared resource; and
distribute, by the designated device, the results of the software discovery operation to the plurality of devices.

8. The computer program product of claim 7, wherein the program instructions further comprise instructions to:
determine that the designated device is no longer able to perform the software discovery operation;
select a second designated device to replace the designated device, wherein the second designated device is selected based on the plurality of performance factors;
receive, from the second designated device, results of the software discovery operation on the shared resource; and
distribute, by the second designated device, the results of the software discovery operation to the plurality of devices.

9. The computer program product of claim 7, wherein the program instructions to select a designated device further comprise instructions to:
exclude one or more devices of the plurality of devices from selection by applying one of: network address filtration, and host name filtration.

* * * * *